United States Patent
Saward

(10) Patent No.: US 6,884,011 B1
(45) Date of Patent: Apr. 26, 2005

(54) TORQUE CONTROL LIMITING TIE DOWN MECHANISM

(75) Inventor: Ronald G. Saward, Shelby Township, MI (US)

(73) Assignee: SportRack LLC, Sterling Heights, MI (US)

( * ) Notice: Subject to any disclaimer, the term of this patent is extended or adjusted under 35 U.S.C. 154(b) by 0 days.

(21) Appl. No.: 10/629,187

(22) Filed: Jul. 29, 2003

Related U.S. Application Data

(60) Provisional application No. 60/399,543, filed on Jul. 29, 2002.

(51) Int. Cl.[7] .................................................. B60P 7/00
(52) U.S. Cl. ....................................... 410/106; 410/101
(58) Field of Search ................................ 410/101, 106, 410/110, 116; 24/265 CD, 115 K; 248/499

(56) References Cited

U.S. PATENT DOCUMENTS

| | | | | |
|---|---|---|---|---|
| 2,962,245 A | * | 11/1960 | Molzan et al. | |
| 3,351,356 A | * | 11/1967 | Clark et al. | 410/110 |
| 4,645,392 A | * | 2/1987 | Takaguchi | 410/80 |
| 6,116,673 A | | 9/2000 | Clonan | |
| 6,183,178 B1 | * | 2/2001 | Bateman | 410/116 |
| 6,585,465 B1 | * | 7/2003 | Hammond et al. | 410/104 |
| 6,641,342 B1 | * | 11/2003 | Girardin | 410/106 |

* cited by examiner

Primary Examiner—Stephen Gordon
(74) Attorney, Agent, or Firm—Rader, Fishman & Grauer PLLC

(57) ABSTRACT

A securing device that permits an operator to know when a desired clamping load has been achieved. The device includes a knob portion and an actuator portion. The knob portion includes a plurality of knob lobes and a plurality of ribs defined by an angle. The actuator portion includes a plurality of deflection tabs, wherein each tab is defined by an angle dimensionally similar to the angle of the each rib, extending from a base portion on a vertical cylinder portion radially distanced from a nut sub-assembly. The securement device incorporates a torque control feature that produces an audible clicking noise when a specific torque has been achieved during hand tightening of the knob portion about the actuator portion.

19 Claims, 7 Drawing Sheets

TORQUE CONTROL LIMITING TIE DOWN MECHANISM

CROSS-REFERENCE TO RELATED APPLICATIONS

This application claims the benefit of U.S. Provisional Application No. 60/399,543 filed Jul. 29, 2002.

BACKGROUND OF THE INVENTION

1. Field of the Invention

The present invention relates generally to securement devices. More particularly, the present invention relates to a tie-down that permits the operator to know when a desired clamping load has been achieved.

2. Background of the Invention

Typically, tie-downs have a knob that holds a loop either externally to a rail or internally down the inside of a side-rail, pointing inboard, that is bolted to the roof of the vehicle. Tie-downs also are typically defined by a screw-thumb-wheel that is screwed or clipped down with the loop.

Although adequate for most applications, the operator may never know that an adequate clamp load (i.e. torque) that the tie-down has been tightened to has been achieved. For example, an operator that is not very strong may under-torque the tie-down, resulting in the undesirable loose securement of items and the sliding of the tie-down down the rail. Even further, the operator may over-torque the tie-down, resulting in the undesirable stripping of the screw in the tie-down mechanism and the potential of failure of the part.

As a result of the drawbacks associated with conventional tie-downs, it is apparent that there is a need for a tie-down that improves securing arrangements by permitting the operator to know when the desired clamp load has been achieved.

SUMMARY OF THE INVENTION

In a first embodiment of the invention, a securement device is described. The device comprises a knob portion and an actuator portion. The knob portion accommodates an operator's hand that permits hand-tightening of the securement device. The knob portion includes a plurality of ribs located in its interior structure. Each rib is defined by an angle. The actuator portion includes at least a plurality of deflection tabs extending from a base portion on a vertical cylinder portion radially distanced from a nut sub-assembly. Each tab is defined by an angle dimensionally similar to the angle of the each rib. The securement device incorporates a torque control feature that produces an audible clicking noise when a specific torque has been achieved during hand tightening of the knob portion about the actuator portion.

Another embodiment of the invention is a securement device. In this embodiment, the securement device comprises a knob portion and an actuator portion. The exterior of the knob portion includes a plurality of knob lobes having a frictional surface for accommodating an operator's hand that permits hand-tightening of the securement device. The knob portion includes a plurality of ribs located in its interior structure, wherein each rib is defined by an angle. The actuator portion includes at least a plurality of deflection tabs extending from a base portion on a vertical cylinder portion radially distanced from a nut sub-assembly engaging a threaded stud and cleat assembly. Each tab provides approximately 9.8 pounds of deflection force. Each tab is defined by an angle dimensionally similar to the angle of the each rib. The angle of the ribs and deflection tabs produces at least 40–45 inch-pounds of torque. The securement device incorporates a torque control feature that produces an audible clicking noise when a specific torque has been achieved during hand tightening of the knob portion about the actuator portion, wherein the torque control feature is the positioning of the deflection tabs on the vertical cylindrical portion causes deflection and torque-induced forces to oppose one another in a radial direction in order to prevent the knob portion and actuator portion from being forced apart, wherein the torque control feature is further defined by a resultant force generated by the deflection of the deflection tabs and ribs produces torque through the nut sub-assembly until the resultant force exceeds the tab deflection force.

Another embodiment of the invention is a securement device. In this embodiment, the securement device comprises a knob portion and an actuator portion. The exterior of the knob portion includes a plurality of knob lobes having a frictional surface for accommodating an operator's hand that permits hand-tightening of the securement device. The knob portion includes a plurality of ribs located in its interior structure, wherein each rib is defined by an angle. The actuator portion includes at least a plurality of deflection tabs extending from a base portion on a vertical cylinder portion radially distanced from a nut sub-assembly engaging a threaded stud and cleat assembly. The actuator portion also includes radial ribs extending radially from a hub portion of the nut sub-assembly to the base portion that connects to each tab. Each tab provides approximately 9.8 pounds of deflection force. Each tab is defined by an angle dimensionally similar to the angle of the each rib. The angle of the ribs and deflection tabs produces at least 40–45 inch-pounds of torque. The securement device incorporates a torque control feature that produces an audible clicking noise when a specific torque has been achieved during hand tightening of the knob portion about the actuator portion, wherein the torque control feature is the positioning of the deflection tabs on the vertical cylindrical portion causes deflection and torque-induced forces to oppose one another in a radial direction in order to prevent the knob portion and actuator portion from being forced apart, wherein the torque control feature is further defined by a resultant force generated by the deflection of the deflection tabs and ribs produces torque through the nut sub-assembly until the resultant force exceeds the tab deflection force.

Another embodiment of the invention is a securement device. The securement device comprises means for gripping and means for torquing. The means for gripping is a knob portion. The exterior of the knob portion includes a plurality of knob lobes having a frictional surface for accommodating an operator's hand that permits hand-tightening of the securement device. The knob portion further includes a plurality of ribs located in its interior structure. Each rib is defined by an angle. The means for torquing is an actuator portion. The actuator portion includes at least a plurality of deflection tabs extending from a base portion on a vertical cylinder portion radially distanced from a nut sub-assembly. Each tab is defined by an angle dimensionally similar to the angle of the each rib. The securement device incorporates a torque control feature that produces an audible clicking noise when a specific torque has been achieved during hand tightening of the knob portion about the actuator portion.

Various additional aspects and advantages of this invention will become apparent to those skilled in the art from the

DESCRIPTION OF THE PREFERRED EMBODIMENTS

Figure 1:
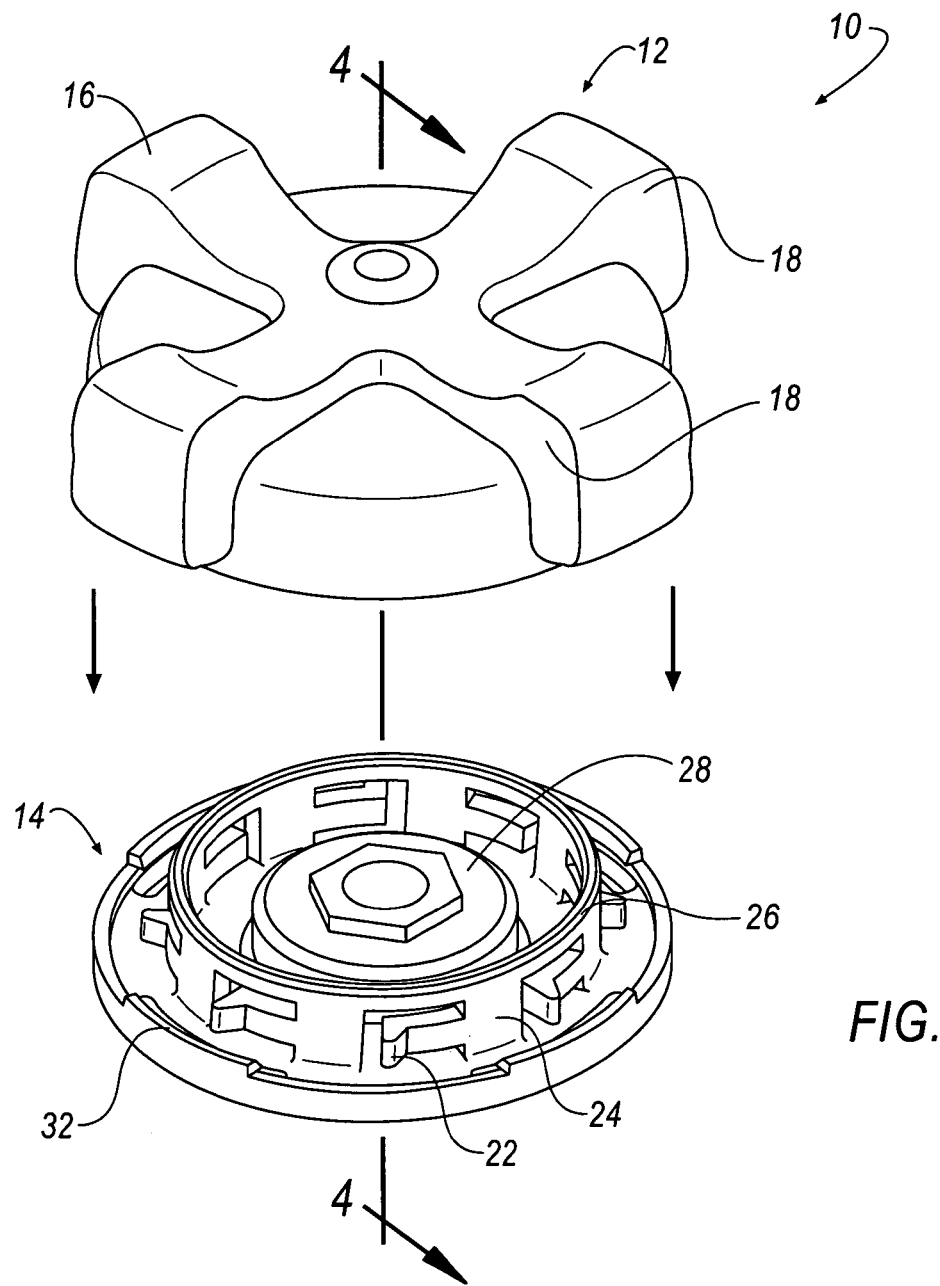
FIG. 1 depicts a perspective view of a knob portion and an actuator portion of a tie-down mechanism.
Figure 7A:
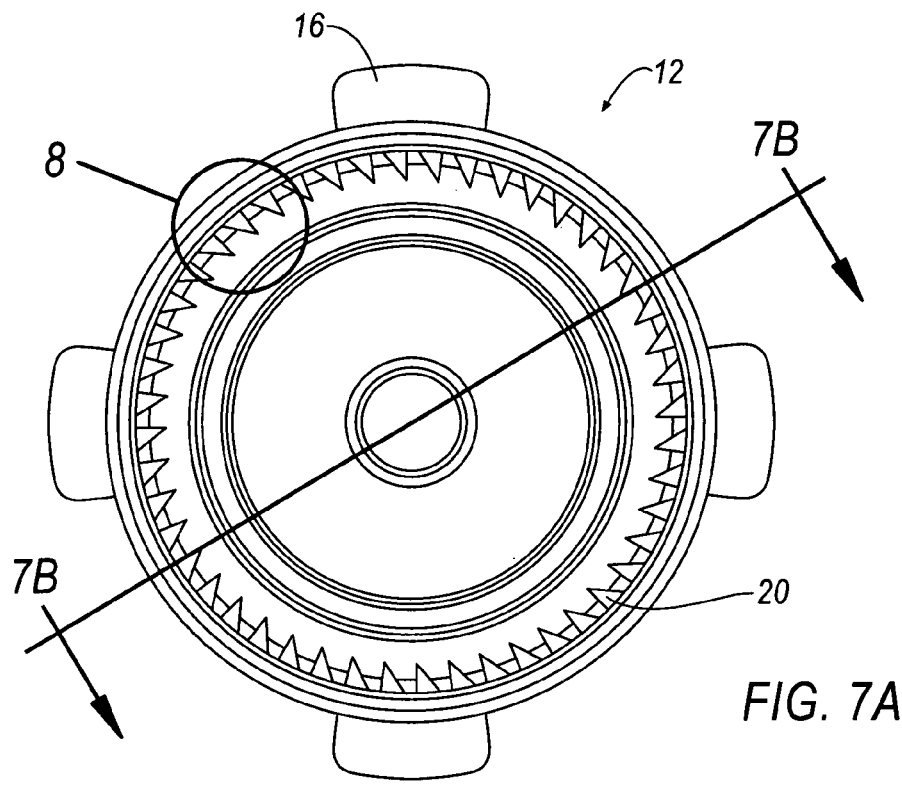
FIG. 7A is a bottom view of the knob portion of FIG. 1 according to one embodiment of the present invention.
Figure 7B:
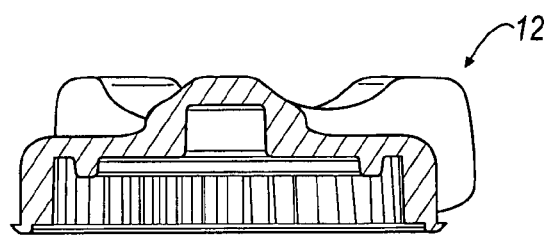
FIG. 7B is a cross-sectional view of the knob portion of FIG. 7A according to one embodiment of the present invention.
Figure 8:
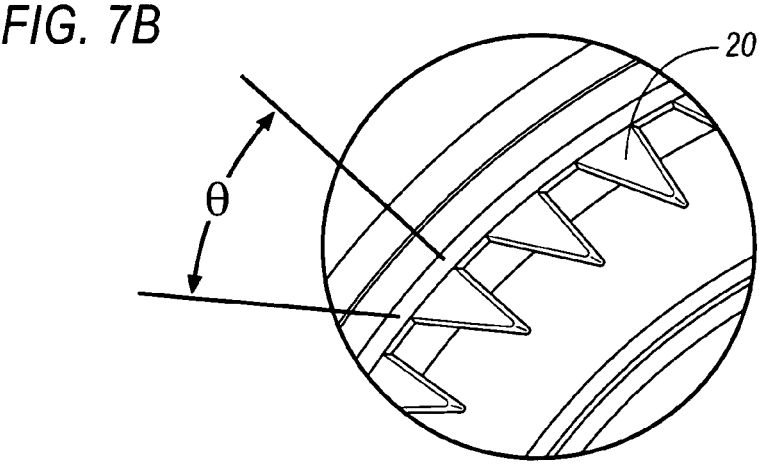
FIG. 8 is a magnified view of the knob portion according to FIG. 7A.
Figure 9:
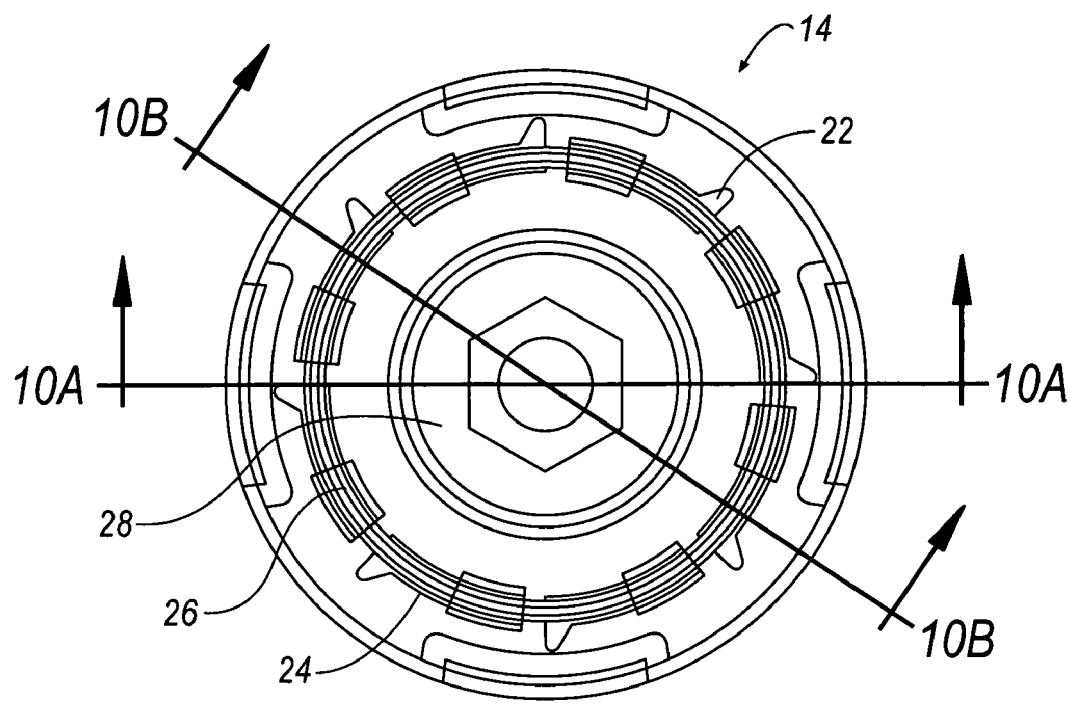
FIG. 9 is a top view of the actuator portion of FIG. 1 according to one embodiment of the present invention.
Figure 10A:
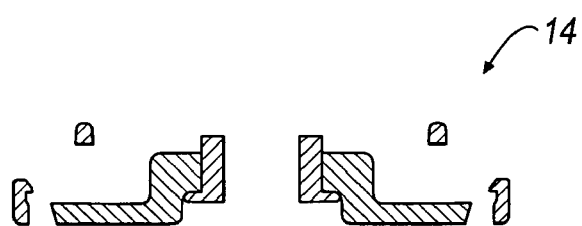
FIG. 10A is a cross-sectional view of the actuator portion of FIG. 9 according to one embodiment of the present invention.
Figure 10B:
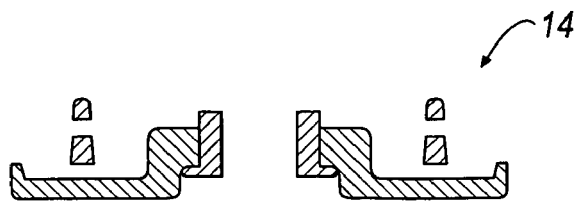
FIG. 10B is a another cross-sectional view of the actuator portion of FIG. 9 according to one embodiment of the present invention.

As seen in FIG. 1, the present invention is directed to a tie-down mechanism, shown generally at 10, which comprises means for gripping, such as a knob portion 12, and means for torquing, such as an actuator portion 14. The exterior of the knob portion 12 includes a plurality of knob lobes 16 having a frictional surface 18 for accommodating an operator's hand that permits hand-tightening of the tie-down mechanism 10. The knob portion 12 also includes a plurality of ribs 20 (FIGS. 2, 7A, and 8) located in its interior structure. The actuator portion 14 includes at least a plurality of deflection tabs 22 (FIG. 1, 2, and 9) extending from a base portion 24 on a vertical cylinder portion 26 radially distanced from a nut sub-assembly 28. In operation, the tie-down mechanism 10 incorporates a torque control feature that produces an audible "clicking" noise when a specific torque has been achieved during hand tightening of the knob portion 12 about the actuator portion 14.

The tie-down mechanism 10 may comprise a 55–60% by weight glass-filled nylon or another similar suitable material. Preferably, at least the deflection tabs 22 of the actuator portion 14 further includes Acetal. More specifically Acetal is available under the tradename of Delrin from Dupont. Acetal is defined to have a high-lubricity surface so that the actuator portion 14 operates as a lubricated part. If desired, the ribs 20 of the knob portion 12 may be lubricated with a similar material.

Figure 2:
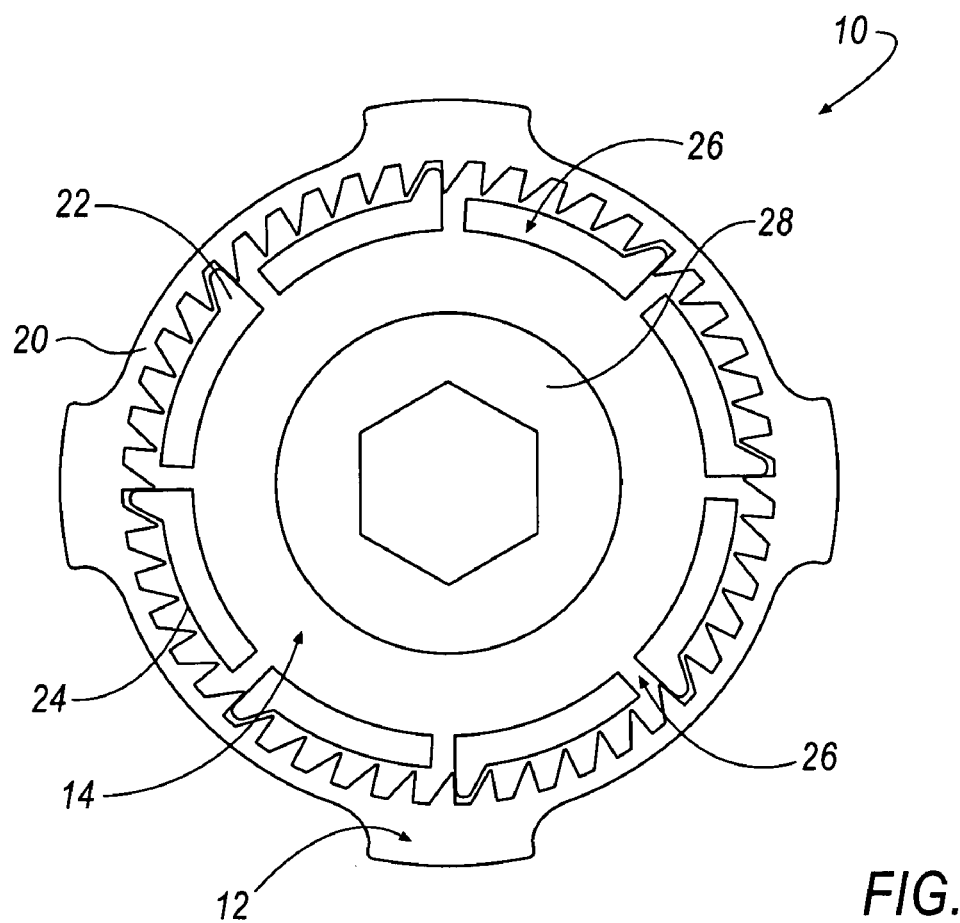
FIG. 2 is a broken top view of the tie-down mechanism of FIG. 1 according to one embodiment of the present invention.

In the illustrated embodiment according to FIG. 2, a series of eight deflection tabs 22 are equally spaced around the vertical cylindrical portion 26. The eight deflection tabs 22 are interfaced with forty-eight ribs 20 protruding inboard toward the vertical cylindrical portion 26. The positioning of the deflection tabs 22 on the vertical cylindrical portion 26 causes the deflection and torque-induced forces to oppose one another in a radial direction in order to prevent the knob portion 12 and actuator portion 14 from being forced apart.

When an operator grips and rotates the knob portion 12 clockwise to cause a tightening of the tie-down mechanism 10, the ribs 20, which are defined to have an angled tip, $\theta$ (FIG. 8), are forced against a mating tip of each tab 22 having a similar angled tip, $\theta$ (not shown), thereby causing the knob portion 12 to rotate the deflection tabs 22 and encapsulated nut sub-assembly 28 of the actuator portion 14. In the illustrated embodiment, each angled tip, $\theta$, is approximately 37.5°.

Figure 3:
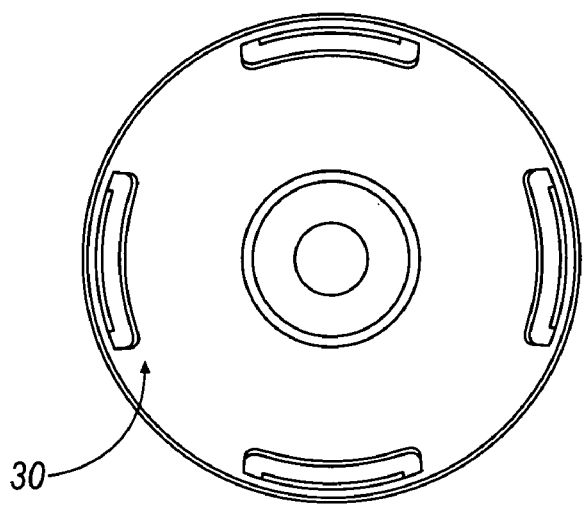
FIG. 3 is a bottom view of the actuator portion of FIG. 1 according to one embodiment of the present invention.
Figure 5A:
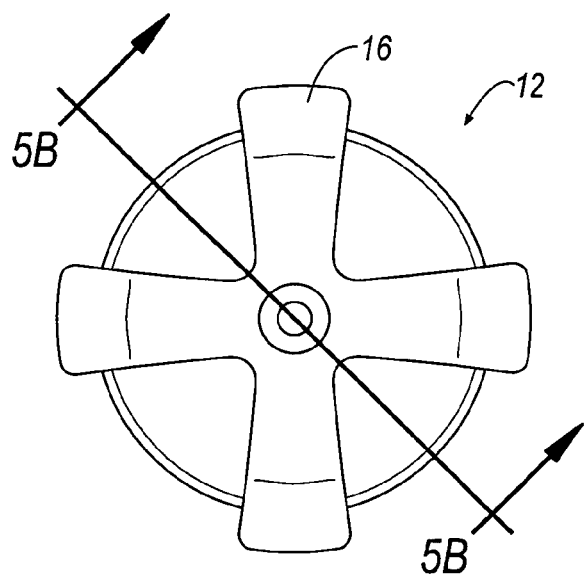
FIG. 5A is a top view of the knob portion of FIG. 1 according to one embodiment of the present invention.
Figure 5B:
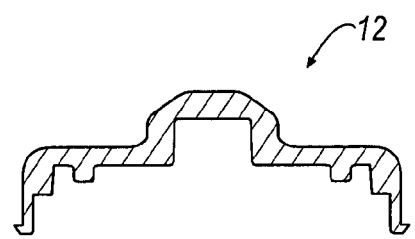
FIG. 5B is a cross-sectional view of the knob portion of FIG. 5A according to one embodiment of the present invention.
Figure 6A:
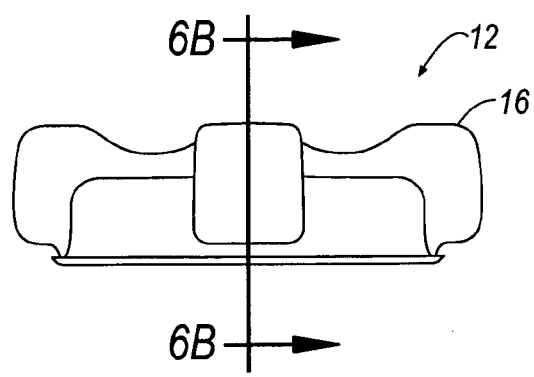
FIG. 6A is a side view of the knob portion of FIG. 1 according to one embodiment of the present invention.
Figure 6B:
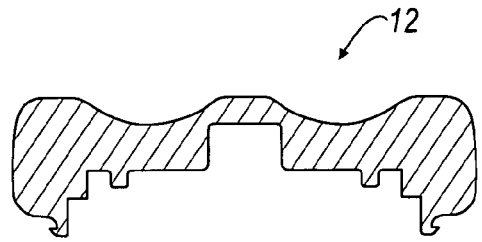
FIG. 6B is a cross-sectional view of the knob portion of FIG. 6A according to one embodiment of the present invention.

When rotated, the nut sub-assembly 28 engages a threaded stud and cleat assembly 30 (FIG. 3), thereby moving the cleat assembly 30 into contact with the walls and open edges of a split rail bolted to a vehicle (not shown). A resultant force generated by the deflection of the deflection tabs 22 and mating ribs 20 produces torque through the nut sub-assembly 28 until the torque force exceeds the tab deflection force. Knob torque is increased to seat the cleat assembly 30 into the rail section, and then provides an audible "clicking" noise when a specific torque is attained, deflecting the deflection tabs 22 inboard to slip past the rotating ribs 20.

Figure 4:
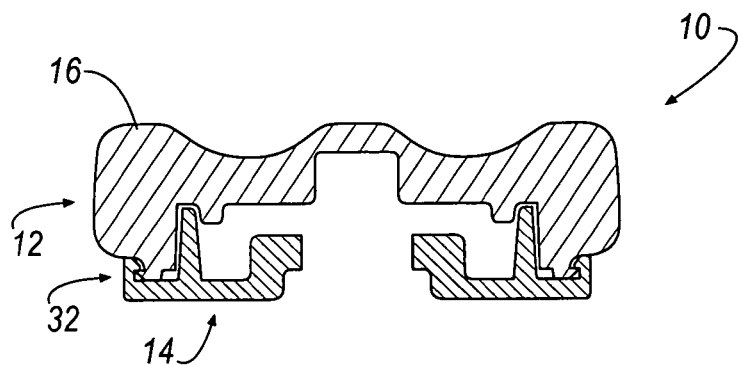
FIG. 4 is a cross-sectional view of the tie-down mechanism according to FIG. 1.

Each angled tip, $\theta$, of the mating tab 22 and rib 20 are approximately the same in dimension; therefore, the knob portion 12 and actuator portion 14 may be molded with any standard injection molding process in order to create dimensionally similar angled tips. Once each portion 12, 14 of the tie-down mechanism 10 is molded to a desirable shape, the knob portion 12 may be snapped and secured to the actuator portion 14 at securing portions 32 (FIGS. 1 and 4) so that upon rotating the knob portion 12, the nut sub-assembly 28 may torque down onto a shaft (not shown) that is coming through from the cleat assembly 30.

According to the illustrated embodiment, the design of each angle, $\theta = 37.5°$, of the angled tips provides approximately 60 inch-pounds of torque for the tie-down mechanism 10. The angle, $\theta$, may be varied so that any desirable amount of torque may be achieved. Because the illustrated embodiment shows eight deflection tabs 22, each tab provides approximately 7.5 inch-pounds of torque effort (e.g. 60 inch-pounds/8 deflection tabs=7.5 inch-pounds per tab).

Through experimentation, it has been discovered that the tie-down mechanism 10 operates at maximum efficiency when each tab 22 provides approximately 9.8 pounds of deflection force required to produce the 7.5 inch-pounds torque at each tab, thereby matching the 60 inch-pounds of the knob so that an operator having at least an average strength can turn the knob portion 12 and make the tie-down mechanism 10 ratchet at the desired torque. In order to secure items having an average pull range, such as within 200–300 pounds, each angle, θ, of the tie-down mechanism 10 may have an angle that produces at least 40–45 inch-pounds of torque.

Figure 11:
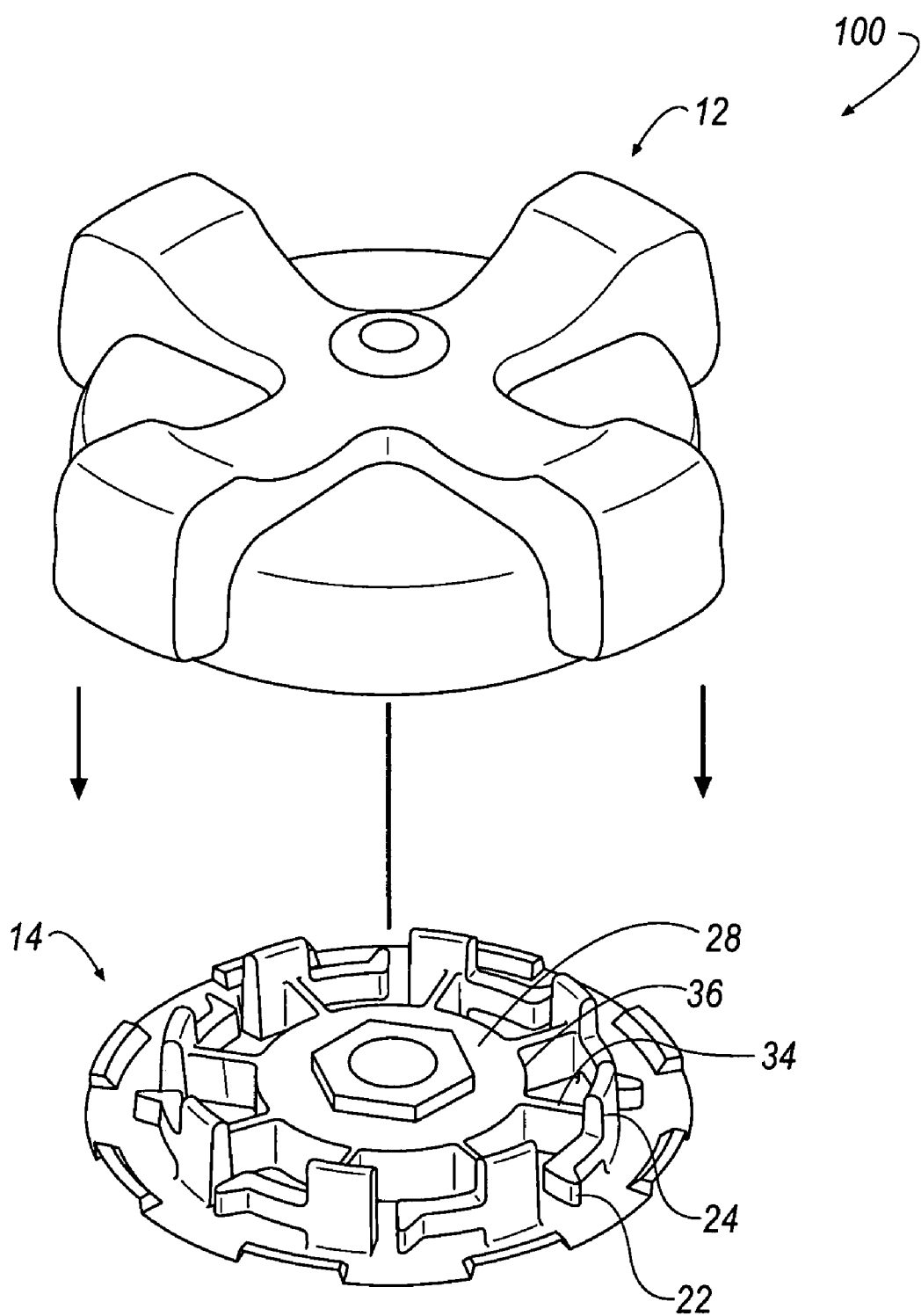
FIG. 11 depicts a perspective view of a knob portion and an actuator portion according to another embodiment of a tie-down mechanism.
Figure 12:
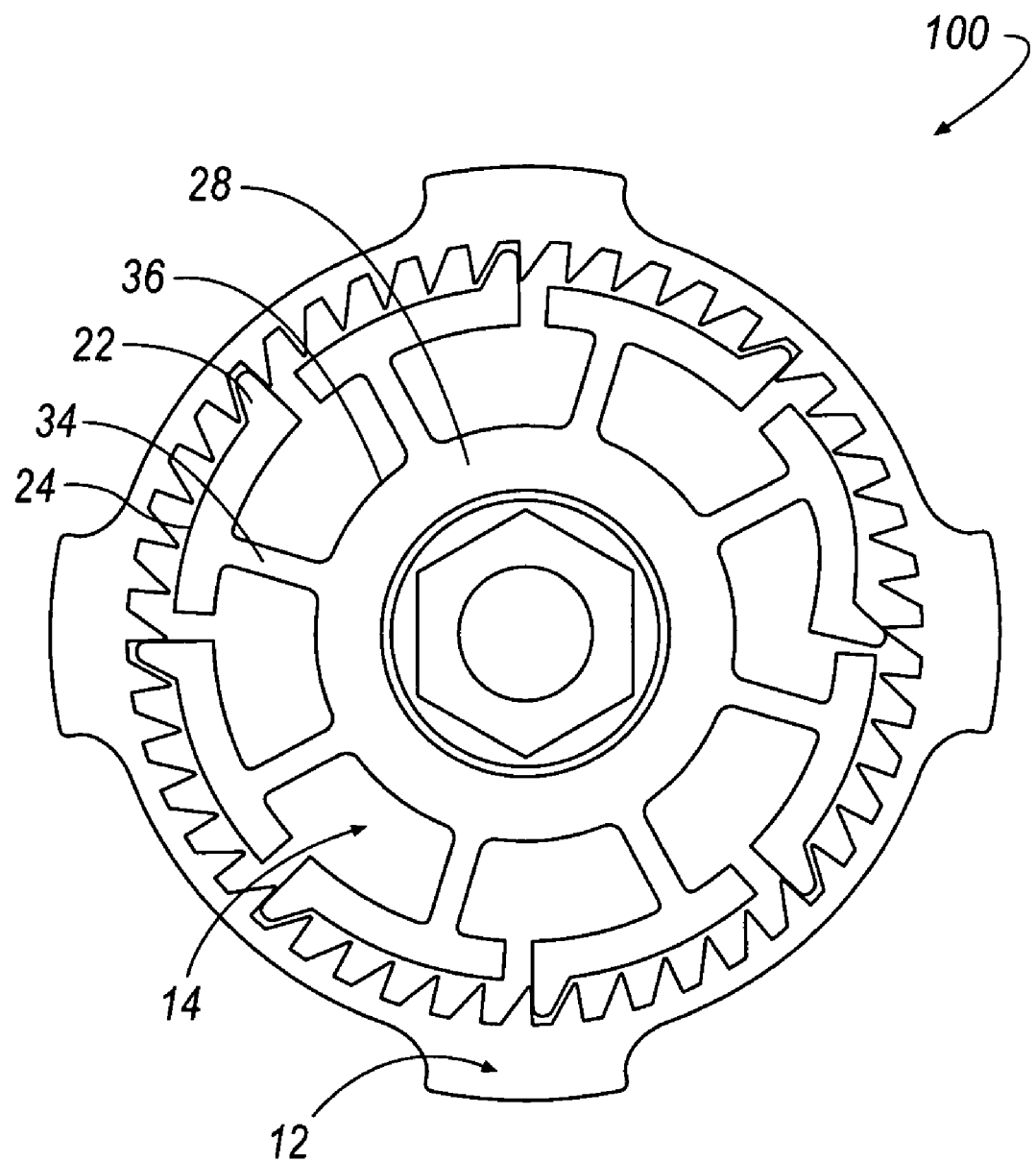
FIG. 12 is a broken top view of the tie-down mechanism of FIG. 11 according to another embodiment of the present invention.

As seen in FIGS. 11–12, an alternate embodiment of the present invention comprises a "heavy-duty" tie-down mechanism 100. The tie-down mechanism 100 operates in similar fashion as described above and includes radial ribs 34. The radial ribs 34 extend radially from a hub portion 36 of the nut sub-assembly 28 to the base portion 24 that connects to each tab 22. The radial ribs 34 implemented in the design of the tie-down mechanism 100 provides additional support when applied loads having a pull range greater than 200–300 pounds are exerted upon the tie-down mechanism 100. Essentially, the radial ribs 34 add extra strength to the part by distributing the forces at the hub portion 36.

Each tie-down mechanism 10, 100 described above may be applied for securing items in an open or closed vehicle. More specifically, in a closed vehicle, the tie-down mechanism 10, 100 may be applied to the exterior of a vehicle, such as a roof-rack. The roof rack application may comprise a tie-down mechanism 10, 100 that cooperates with a luggage or cargo rack side- or cross-rail. In another application for a closed vehicle, the tie-down mechanism 10, 100 may be located on a luggage or cargo rack side- or cross-rail within the vehicle's interior in the cargo area of a sports-utility-vehicle (SUV). Alternatively, in an open vehicle application, the tie-down mechanism 10, 100 may be located on a luggage or cargo rack side- or cross-rail within the bed of a pick-up truck.

Essentially, the tie-down mechanism 10, 100 produces a ratcheting effect similar to a torque wrench where a certain torque is achieved and over-torquing is prevented. Even further, because the tie-down mechanism 10, 100 limits an applied torque, the knob portion 12 is prevented from "blowing out" (i.e. separating) from the actuator portion 14. Thus, because the deflection tabs 22 may slip across the ribs 20, causing a "clicking" noise, the resulting torque generated by the tie-down mechanism 10, 100 is limited so that an operator knows when the desired toque is achieved. Thus, the uncertainty of under- or over-torquing the tie-down mechanism 10, 100 is eliminated.

The foregoing detailed description shows that the preferred embodiments of the present invention are well suited to fulfill the objects of the invention. It is recognized that those skilled in the art may make various modifications or additions to the preferred embodiments chosen here to illustrate the present invention, without departing from the spirit of the present invention. Accordingly, it is to be understood that the subject matter sought to be afforded protection hereby, should be deemed to extent to the subject matter defined in the appended claims, including all fair equivalence thereof.

What is claimed is:

1. A securement device, comprising:
   a knob portion, wherein the exterior of the knob portion includes a plurality of knob lobes having a frictional surface for accommodating an operator's hand that permits hand-tightening of the securement device, wherein the knob portion further includes:
   a plurality of ribs located in its interior structure, wherein each rib is defined by an angle; and
   an actuator portion, including:
   at least a plurality of deflection tabs extending from a base portion on a vertical cylinder portion radially distanced from a nut sub-assembly, wherein each tab is defined by an angle dimensionally similar to the angle of the each rib, wherein the securement device incorporates a torque control feature that produces an audible clicking noise when a specific torque has been achieved during hand tightening of the knob portion about the actuator portion.

2. The securement device of claim 1, wherein the securement device is applied in a closed vehicle application.

3. The securement device of claim 2, wherein the closed vehicle application is a roof-rack application.

4. The securement device of claim 2, wherein the closed vehicle application is a vehicle interior in a cargo area.

5. The securement device of claim 1, wherein the securement device is applied in an open vehicle application.

6. The securement device of claim 5, wherein the open vehicle application is a bed of a pick-up truck.

7. The securement device of claim 1 further including radial ribs extending radially from a hub portion of the nut sub-assembly to the base portion that connects to each tab.

8. The securement device of claim 1, wherein the torque control feature is the positioning of the deflection tabs on the vertical cylinder portion causes deflection and torque-induced forces to oppose one another in a radial direction in order to prevent the knob portion and actuator portion from being forced apart.

9. The securement device of claim 1, wherein the torque control feature is further defined by a resultant force generated by a deflection of the deflection tabs and ribs, which produces torque through the nut sub-assembly until the resultant force exceeds a tab deflection force.

10. The securement device of claim 1, wherein the nut sub-assembly engages a threaded stud and cleat assembly.

11. The securement device of claim 1 further including securing portions for securing the knob portion to the actuator portion so that upon rotating the knob portion, the nut sub-assembly may torque down onto a shaft.

12. The securement device of claim 1, wherein the securement device includes 55–60% by weight glass-filled nylon.

13. The securement device of claim 12, wherein at least the deflection tabs of the actuator portion further includes an Acetal material defined to have a high-lubricity surface so that the actuator portion operates as a lubricated part.

14. The securement device of claim 1, wherein each tab provides approximately 9.8 pounds of deflection force.

15. The securement device of claim 1, wherein the angle of the ribs and deflection tabs produces at least 40–45 inch-pounds of torque.

16. A securement device, comprising:
   a knob portion, wherein the exterior of the knob portion includes a plurality of knob lobes having a frictional surface for accommodating an operator's hand that permits hand-tightening of the securement device, wherein the knob portion further includes:
   a plurality of ribs located in its interior structure, wherein each rib is defined by an angle; and
   an actuator portion, including:
   at least a plurality of deflection tabs, each tab providing approximately 9.8 pounds of deflection force, extending from a base portion on a vertical cylinder portion radially distanced from a nut sub-assembly engaging a threaded stud and cleat assembly, wherein each tab is defined by an angle dimensionally similar to the angle of the each rib, wherein the angle of the ribs and deflection tabs produces at least 40–45 inch-pounds of torque, wherein the securement device incorporates a torque control feature that produces an audible clicking noise when a specific torque has been achieved during hand tightening of the knob portion about the actuator portion, wherein the torque control feature is the positioning of the deflection tabs on the vertical cylindrical portion which causes deflection and torque-induced forces to oppose one another in a radial direction in order to prevent the knob portion and actuator portion from being forced apart, wherein the torque control feature is further defined by a resultant force generated by deflection of the deflection tabs and ribs, which produces torque through the nut sub-assembly until the resultant force exceeds the tab deflection force.

17. The securement device of claim 16 further including securing portions for securing the knob portion to the actuator portion so that upon rotating the knob portion, the nut sub-assembly may torque down onto a shaft.

18. The securement device of claim 16, wherein the securement device includes 55–60% by weight glass-filled nylon.

19. The securement device of claim 18, wherein at least the deflection tabs of the actuator portion further includes an Acetal material defined to have a high-lubricity surface so that the actuator portion operates as a lubricated part.

* * * * *